Figure 1:
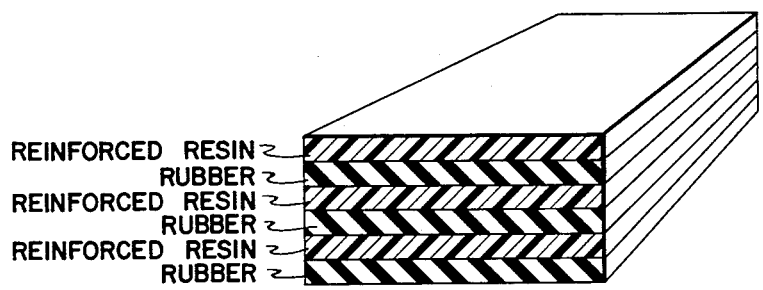

March 20, 1962    B. M. VANDERBILT ET AL    3,026,223

CO-CURED RUBBER AND REINFORCED RESIN

Filed Jan. 14, 1958

Byron M. Vanderbilt
Charles F. Marsden, Jr.    Inventors
Albert M. Gessler

By    Attorney 3,026,223
CO-CURED RUBBER AND REINFORCED RESIN
Byron M. Vanderbilt, Westfield, Charles F. Marsden, Jr., Bedminster, and Albert M. Gessler, Cranford, N.J., assignors to Esso Research and Engineering Company, a corporation of Delaware
Filed Jan. 14, 1958, Ser. No. 708,791
10 Claims. (Cl. 154—43)

The present invention relates to a unitary structure composed of a rubbery polymer bound to a reinforced resin, and more particularly relates to a method for co-curing an unsaturated rubbery polymer and an unsaturated curable liquid to form a unitary structure.

In the past, it has been difficult to co-cure rubber and the usual curable liquids used as binders for reinforcing agents such as glass. The usual method to obtain a rubber-coated reinforced resin was to cure the rubber and the curable binder in separate operations. The cured items could then be joined through the utilization of a third material as a tie-ply cement. Furthermore, the two-step operation, as used in placing a rubber liner on either a steel or glass reinforced pipe, is expensive and the adhesion is poor.

The problem of co-curing with rubber is particularly important in glass-reinforced pipe. Pipes of this type have serious limitations in conjunction with the transportation of liquids as water and oil. They are pervious to moisture and the glass fibers therein are weakened by transporting the liquids and finely divided solids. For this reason, it has been necessary to develop liners in order to protect the pipe. Among the liners developed was a built-up layer of the same thermosetting resin that was used in the reinforced pipe, e.g., polymeric resin of major butadiene and minor styrene. This has not been successful since the resin is hard and substantially non-elastic and cracking occurs. Therefore, weeping of the pipe results when relatively high operating pressures are employed. Another type of liner used to protect the pipe is a layer of thermoplastic resin such as polyvinyl chloride. However, this liner is not adequate since the lined pipe cannot be used either below about 20° F. due to embrittlement or above 200° F. because of thermoplasticity. A polyvinyl chloride liner per se is also not suitable since it will not adhere to certain resins, e.g., butadiene-styrene resin.

It has also been suggested that polymers of diolefins of 4 to 6 carbon atoms, copolymerized if desired, with ethylenically unsaturated monomers, such as styrene, be used as bonding agents for glass fibers and the like in the manufacture of reinforced pipes. However, it has been found difficult to provide suitable liners for such pipes.

It has now been discovered, however, that rubbery materials can be co-cured with a curable liquid and reinforcing agent to form a unitary product, provided critical curing temperatures are used and the curing takes place in the presence of a specific catalyst. A liner has been prepared that overcomes the disadvantages previously encountered in the prior methods, and a suitable liner has been found for a glass reinforced-diolefin resin pipe as will be described below.

In accordance with one embodiment of this invention, therefore, a rubbery polymer is compounded, calendered to the required size, and laminated to any desired form (e.g., a cylindrical hollow pipe or a solid rectangular sheet) with a reinforcing agent coated with a curable liquid. The reinforcing agent is coated with a curable liquid by any suitable means such as by passing it through a solution of the curable liquid. The rubber-reinforced resin laminate is then cured to a unitary structure.

Figure 2:
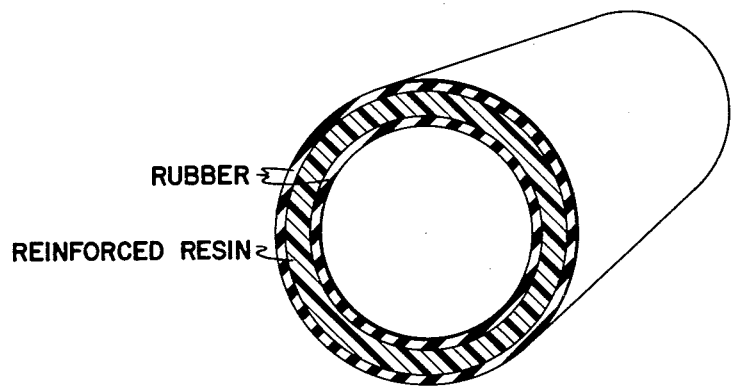
Figure 2:

Referring to the drawing, FIGURE 1 is a solid rectangular laminate which consists of alternating layers of rubber and reinforced resin that have been co-cured to a unitary product. FIGURE 2 is a hollow cylindrical pipe of a reinforced resin with a rubber inner and rubber outer liner. The resin and rubber were also cured simultaneously to form a unitary composite pipe.

The rubbery polymers that fall within the purview of this invention are those which are unsaturated and, therefore, include ABR (formerly GR-N), SBR (formerly GR-S, copolymer of major butadiene and minor styrene), natural rubber, and neoprene. ABR is preferred because of the high resistance to swelling in oils, solvents, and greases. It is also preferred since it is insoluble in some of the cross-linking agents (e.g., methyl styrene) that are incorporated in the resins.

ABR is the rubbery polymer obtained by polymerizing a butadiene hydrocarbon having the general formula

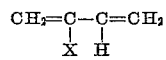

wherein $x$ is hydrogen or alkyl with a compound having the general formula

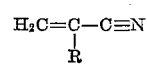

wherein R is hydrogen or alkyl. The butadiene hydrocarbon should be 50 to 85% of the total weight of the reactants. One method of preparation is as follows: The mixture of the reactants, may be emulsified with water in the presence of an emulsifying agent, as a soap. The emulsion is polymerized by means of a peroxide catalyst with shaking or stirring at a temperature between about 30° to 100° C. The polymerized products are in the form of a latex-like emulsion which can be coagulated by freezing out or by adding a suitable acid and/or alkali metal salt. The preferred polymer is prepared by reacting 75 to 45% butadiene and 25 to 55% acrylonitrile. The preparation of this copolymer is described in U.S. Patent 1,973,000 which is incorporated herein by reference.

If desired, the ABR rubber may be blended with polyvinyl chloride. The liner prepared from this blend is both flexible and oil resistant. Polyvinyl chloride may be incorporated in the range of 0 to 150 parts per 100 parts by weight of rubber, but the preferred range is 75 to 100 parts. Polyvinyl chloride can be blended with the rubber in the compounding step as in Banbury mixing, or latices of the rubber and the polyvinyl chloride may be mixed and co-precipitated.

In addition to being blended with polyvinyl chloride, the ABR is compounded with other materials as stabilizers, plasticizers, fillers, accelerators, softeners, and curatives. One limitation is that sulfur and dioxines cannot be used to vulcanize ABR or any other rubber since they poison the curing or setting up of the reinforced resin of this invention. The compounding can be performed by any known conventional method.

An important feature of this invention is the use of a curative for the rubber composition and a catalyst for the resin which results in a good bond between the two materials when cured at a common temperature and time interval. Peroxides and hydroperoxides have been used in the past as catalysts for hardening unsaturated curable liquids such as polyesters and various curable hydrocarbon liquids. However, it has been found that only dicumyl peroxide will be satisfactory for co-curing the two materials of this invention. More active peroxides, as benzoyl peroxide, require a curing temperature of only 200–250° F. which is below the temperature required to cure the rubber or rubber-polyvinyl chloride blend. The dicumyl peroxide catalyst should be added in the range of 0.5 to 6% of the curable liquid mix and 0.5 to 3% of the rubbery polymer mix.

Curable liquids within the purview of this invention comprise those which are unsaturated. However, the preferred resins comprise the polymer oils obtained by polymerizing conjugated diolefins having 4 to 6 carbon atoms per molecule. Polyesters may be substituted for these polymeric oils but are less desirable. The synthetic polymeric oils may be prepared by mass polymerization, either in the presence of a hydrocarbon soluble peroxide catalyst or in the presence of metallic sodium. The oils included in this invention are prepared from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring (paramethyl styrene, dimethyl styrene, etc.), may also be used.

An especially preferred polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent (based on sodium) of an alcohol such as methanol, isopropanol, or an amyl alcohol in order to overcome the initial induction period. The resulting product may vary in viscosity from 0.15 to 20 poises, and may be altered as desired for use in the curable liquid mix. The preparation of this oil and its resin is described in U.S. Patent 2,762,851.

The polyesters which may be used in this invention are well known. They may be derived by the condensation of compounds containing hydroxyl and carboxyl groups and have a typical structure as below:

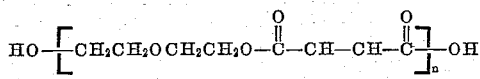

where $n$ represents the degree of polymerization. A typical unsaturated polyester may be prepared by reacting an unsaturated polybasic acid, or its anhydride such as maleic anhydride, with a polyhydric alcohol such as diethylene glycol. The reaction may proceed at elevated temperature. It is these unsaturated polyesters that can be included in this invention, for these compounds can be cross-linked to hard rigid structures. Both of the polyesters and polymer oils described above when used for impregnating reinforcing agents can be laminated and co-cured with a rubbery polymer by means of a catalyst within a particular temperature range.

Cross-linking agents are added to either the polyester or polymeric oil to impart an effective cross-linking of the resin. Such agents comprise the following compounds: Vinyl aromatics as styrene and vinyl toluene; halo styrenes; vinyl naphthalenes; alkyl acrylates and methacrylates; and allyl esters. Preferred compounds are diallyl phthalate and the styrenes. The cross-linking agents should be incorporated in the range of 10 to 50% of the curable liquid mix.

The preferred reinforcing agent used in this invention is glass fiber, although other mineral fibers, such as asbestos, mica, and celite; vegetable fibers, such as cotton, linen, rayon, and silk; other organic fibers such as hair, nylon, and orlon; and metal fibers such as iron, aluminum, copper, and the like are suitable for use in this invention. It is within the scope of this invention to use glass fibers which have been treated with an unsaturated organic halo silane, having the formula $R_nSiX_{4-n}$ where R is vinyl or allyl group, $n$ is a positive integer equal to 1, 2, or 3, and X is halogen. It is preferred to employ those silanes wherein $n$ is equal to 1, i.e., those containing 3 atoms of halogen substituted on the silicon. It is believed that the above-described chlorosilanes react with the hydroxyl groups in the glass, liberating hydrogen chloride. The unsaturated or vinyl portion of the molecule thus bound to the glass through the silicon atom reacts with the unsaturated liquid polymer oil described above during the curing step, thus effectively bonding the curable liquid and the glass fiber.

The unsaturated rubbery polymer, e.g., ABR, which has been compounded, can be calendered and cut into the size and shape dependent upon the end use. The method of applying the polymer and oily polymer-coated reinforcing agent is also dependent upon the end use. For example, in the manufacture of solid, rectangular sheets, layers of rubbery polymer are alternated with layers of coated reinforcing agent. The number of layers and the thickness of each will vary as desired. The resulting laminate of rubbery polymer and coated reinforcing agent can then be co-cured to a unitary product.

In another embodiment of the invention, the rubber and coated reinforcing agent are used in the manufacture of cylindrical hollow pipes. A glass reinforced plastic pipe lined with ABR rubber can be prepared as follows: The ABR rubber is cut and calendered into strips of tape which are wound about a mandrel of metal, such as steel, with a highly polished and preferably chrome plated outer surface. The rubber tape can be wound at an angle to the axis of the mandrel in a manner described in U.S. Patent 2,714,414. A suitable angle is that described in U.S. Patent 2,747,626 where the angle A is determined by the equation $$3 \sin^2 a + (2/m) \sin a = 1$$

in which $m$ is the ratio of the total cross-sectional area of all the helically disposed rubber to the total cross-sectional area of all the longitudinally disposed rubber. After the desired thickness of the rubber inner layer is attained, glass fibers impregnated with a curable liquid (e.g., polyester or a polydiolefin) are wound on top of the rubber inner layer in a similar manner. After the desired thickness of fiber glass and curable liquid middle layer is obtained, a rubber outer layer can be wound on top of the impregnated fibers by a similar method. This structure can then be co-cured to a unitary product.

Any laminated structure obtained such as the rectangular sheet or cylindrical pipe can be cured in one operation by the application of heat within a temperature range between 250° to 300° F. A temperature above 300° F. cannot be employed for it approaches the boiling point of the cross-linking agents incorporated in the curable liquid mix. Below 250° F. vulcanization of the rubber will not take place. The time of cure will be dependent upon the temperature and will be within the range of 15 minutes to 2 hours. It is also desirable to incorporate slight pressure during the curing operation which can be within the range of 0 p.s.i.g. to 200 p.s.i.g. It may also be advantageous to have a postcure at 275° to 325° F. for 1 to 50 hours.

Thus, in accordance with this invention, a unitary product can be prepared by the co-curing of an unsaturated rubber and a reinforcing agent impregnated with a curable liquid. Pipes prepared in accordance with this invention can be used to transport liquids such as oil and water since they are impervious to moisture and there is no attack on the glass fibers therein. This, therefore, overcomes a serious limitation of glass reinforced pipes per se. Weeping, which was a limiting factor in the use of a thermosetting resin liner, will not occur with this co-cured rubber liner. A co-cured rubber lined-reinforced pipe can be used below a temperature of 20° F. and above 200° F., thereby overcoming the limitations of the prior art thermoplastic resin liner. It is now possible to obtain a pipe with an inner and outer rubber lining which can be co-cured in one operation. The adhesion is excellent and the expensive two-step operation has been eliminated. A suitable liner has now been also obtained for a reinforced pipe in which the reinforced agent is glass and the resin is the copolymer of a 4–6 carbon diolefin monomer and an ethylenically unsaturated monomer.

The following examples are submitted to illustrate but not to limit this invention.

*Example I*

One hundred parts of a butadiene-acrylonitrile rubbery copolymer containing about 35% of combined acrylonitrile was blended with 100 parts of a powder of polyvinyl chloride on a rubber mill at a temperature range of 250° to 280° F. The mill was cooled to a temperature range of 180° to 220° F. and the rubber compounded with the following materials:

Stabilizers—3 parts Aminox (a di-phenyl amine condensed with an aldehyde such as formaldehyde) and 5 parts dyphos (a lead phosphite stabilizer for polyvinyl chloride)
Filler—40 parts Philblack A (a furnace black, FEF)
Accelerator—5 parts zinc oxide, 1 part stearic acid
Softener—20 parts paraplex G–25 (a saturated polyester)
Catalyst—1.5 parts dicumyl peroxide These materials were mixed at the 180° to 200° F. temperature range to give a uniformly mixed blend. The compounded rubber was then calendered to 10 mils in thickness and cut into tape 4 inches wide. The rubber was then wound on a steel mandrel in an overlapping manner to a layer which was 20 mils thick. Glass fibers were coated with a mix consisting of 50% of the sodium copolymer of 80% butadiene and 20% styrene, 50% of vinyl toluene, and 4 parts of dicumyl peroxide per 100 parts of the mix. The glass fibers were about double the weight of the resinifiable mix. The coated fibers were then wound upon the mandrel on top of the inner rubber layer in an overlapping manner to result in a layer of about 0.17 inch. An outer layer of the compounded rubber tape was then also wound upon the mandrel on top of the glass reinforced resin layer to a layer of 10 mils. The entire structure was then wound with 1 mil polyester film to hold the rubber tape, resin, and glass fibers in place. The mandrel with the inner rubber layer, glass reinforced curable liquid middle layer, and rubber outer layer was placed in a hot air furnace and heated for 1 hour at 290° F. at atmospheric pressure. At the end of this time, a rigid pipe was formed with a continuous uniform layer of vulcanized ABR (nitrile) rubber blend strongly adhered to both the inner and outer surfaces of the reinforced plastic. The polyester film was easily removed from the cured pipe.

*Example II*

The rubber stock of Example I was molded into 0.075-inch thick sheets and cured for 1 hour at 285° F. The vulcanizate had the following properties:

Tensile strength_____p.s.i__ 2925
Ultimate elongation_____percent__ 350
Bell brittleness point [a]_____° F__ —8
Volume swell, ASTM #1 fuel [b]_____percent__ 24.6

[a] Specimen postcured at 300° F. for an additional 10 hours prior to testing.
[b] Contains 40% of aromatic hydrocarbons.

*Example III*

The compounded, uncured rubbery copolymer from Example I was immersed for 1 week in ASTM Fuel #1 (contains aromatics; Saybolt Universal viscosity of 98 seconds at 200° F.; flash point, 470° F.) at room temperature and atmospheric pressure. The volume swell at the end of this time was 24.6%.

In another test, 30 pounds of steam was run through a section of cured pipe prepared in accordance with Example I for a period of 1 week. No adverse effects occurred. Sections of cured pipe were immersed in ASTM Fuel #1 for 1 week at room temperature. Other sections of the cured pipe were immersed in water for 1 week at room temperature. The rubber did not swell or pull away from the pipe. These series of tests indicate that the pipe is resistant to oil, steam, and solvents.

*Example IV*

Fifty parts of a butadiene-acrylonitrile rubber copolymer containing about 45% of combined acrylonitrile and 50 parts of a copolymer containing about 35% of combined acrylonitrile were blended with 100 parts of a powder of polyvinyl chloride on a rubber mill at a temperature range of 250° to 280° F. The mill was cooled to a temperature range of 180° to 220° F. and the rubber compounded with the following materials:

Stabilizers—3 parts Aminox (a di-phenyl amine condensed with an aldehyde such as formaldehyde) and 5 parts dyphos (a lead phosphite stabilizer for polyvinyl chloride)
Filler—40 parts Philblack A (a furnace black FEF)
Accelerator—5 parts zinc oxide, 1 part stearic acid
Softener—20 parts paraplex G–25 (a saturated polyester)
Catalyst—1.5 parts dicumyl peroxide These materials were mixed at the 180° to 200° F. temperature range to give a uniformly mixed blend. The compounded rubber was then calendered to 10 mils in thickness and cut into tape 4 inches wide. The rubber was then wound on a steel mandrel in an overlapping manner to a layer which was 20 mils thick. Glass fibers were coated with a mix consisting of 55% of the sodium copolymer of 80% butadiene and 20% styrene, 45% of monomeric styrene, and 4 parts of dicumyl peroxide per 100 parts of the mix. The glass fibers were about 65% of the resin-glass matrix. The coated fibers were then wound upon the mandrel on top of the inner rubber layer in an overlapping manner to result in a layer of 0.15 inch. An outer layer of the compounded rubber tape was then also wound upon the mandrel on top of the glass reinforced resin layer to a layer of 20 mils. The entire structure was then wound with 1 mil polyester film to hold the rubber tape, resin, and glass fibers in place. The mandrel with the inner rubber layer, glass reinforced curable liquid middle layer, and rubber outer layer was placed in a hot air furnace and heated for 1 hour at 290° F. at atmospheric pressure. At the end of this time, a rigid pipe was formed with a continuous uniform layer of vulcanized ABR (nitrile) rubber blend strongly adhered to both the inner and outer surfaces of the reinforced plastic. The polyester film was easily removed from the cured pipe.

*Example V*

The rubber stock of Example IV was calendered into 0.075-inch thick sheets and cured for 1 hour at 285° F. The vulcanizate had the following properties:

Tensile strength _____ p.s.i__ 3180
Ultimate elongation _____ percent__ 300
Volume swell, ASTM #1 Fuel ᵃ _____ do____ 28.9

ᵃ Contains 40% of aromatics.

*Example VI*

The rubbery copolymer from Example IV was immersed for 1 week in ASTM Fuel #1 at room temperature and atmospheric pressure. The volume swell at the end of this time was 28.9%.

In another test, 30 pounds of steam was run through a section of cured pipe prepared in accordance with Example IV for a period of 1 week. No adverse effects occurred. Sections of this cured pipe were immersed in ASTM Fuel #1 for 1 week at room temperature. Other sections of the cured pipe were immersed in water for 1 week at room temperature. The rubber did not swell or pull away from the pipe. These series of tests indicate that the pipe is resistant to oil, steam, and solvents.

*Example VII*

One hundred parts of a butadiene acrylonitrile rubbery copolymer containing about 45% of combined acrylonitrile was blended on a rubber mill at a temperature of 250° to 280° F. The mill was cooled to a temperature range of 100° to 125° F. and the rubber was compounded with the following materials:

Stabilizer—3 parts Aminox
Filler—100 parts Philblack
Accelerator—5 parts zinc oxide, 1 part stearic acid
Softener—20 parts Paraplex G-25
Catalyst—1.5 parts dicumyl peroxide These materials were mixed at 100° to 125° F. temperature range to give a uniformly mixed blend. The rubbery copolymer described was immersed for 1 week in ASTM Fuel #1 at room temperature and atmospheric pressure. The volume swell at the end of this time was 12.3%.

A glass reinforced pipe with an inner layer and outer layer of the rubbery copolymer was prepared in a similar procedure as described in Examples I and IV. In another test, 30 pounds of steam was run through a section of pipe, prepared in accordance with the above description, for a period of 1 week. No adverse effects occurred. Sections of this cured pipe were immersed in ASTM Fuel #1 for 1 week at room temperature. Other sections of the cured pipe were immersed in water for 1 week at room temperature. The rubber did not swell or pull away from the pipe. These series of tests indicate that the pipe is resistant to oil, steam, and solvents.

It is apparent from the above examples that it is now possible to co-cure a rubber and a reinforced resin to a unitary product in one operation. A pipe can be prepared that will permit the transportation of liquids such as water and oil because the pipe is impermeable to moisture and is not weakened. It is then possible by the use of dicumyl peroxide as catalyst and a temperature range of 250° to 300° F. to prepare reinforced plastic pipe with an inner and outer rubber lining. A liner has been prepared that is satisfactory for a glass reinforced pipe with a butadiene-styrene resin.

Having set forth the general nature and specific embodiments of the present invention, the true scope is now particularly pointed out in the appended claims.

What is claimed is:
1. A laminate comprising a rubbery polymer layer selected from the group consisting of a copolymer of butadiene with acrylonitrile, a copolymer of butadiene with styrene, natural rubber, and neoprene; and an adjacent thermosetting resin layer prepared from a liquid polymer of a $C_4$ to $C_6$ conjugated diolefin with a reinforcing element imbedded therein; said rubbery polymer layer having dicumyl perioxide therein; said thermoseting resin layer having dicumyl peroxide therein; said layers having been co-cured each from an uncured state at a temperature of at least 250° F. to provide a unitary structure therefrom.

2. A composite pipe which comprises a rubber inner layer comprising a copolymer of butadiene with acrylonitrile, polyvinyl chloride, and 0.5 to 3% of dicumyl peroxide; a thermosetting resin middle layer with glass fibers imbedded therein prepared from a liquid polymer of a $C_4$ to $C_6$ conjugated diolefin provided in the presence of an alkali metal catalyst, a crosslinking agent selected from the group consisting of styrene, vinyl toluene, and diallyl phthalate, and 0.5 to 6% of dicumyl perioxide; and a rubber outer layer comprising a copolymer of butadiene with acrylonitrile, polyvinyl chloride, and 0.5 to 3% of dicumyl peroxide; said inner, middle, and outer layers having been co-cured each from an uncured state at a temperature between 250° F. and 300° F. to provide a hard, inflexible, unitary product therefrom which is capable of transporting liquids without weeping therein.

3. A process which comprises forming an uncured rubbery layer comprising dicumyl peroxide and a rubbery polymer selected from the group consisting of a copolymer of butadiene with acrylonitrile, a copolymer of butadiene with styrene, natural rubber, and neoprene; forming an uncured resinifiable mix layer with a reinforcing element imbedded therein comprising a curable thermosetting resin of a liquid polymer of a $C_4$ to $C_6$ conjugated diolefin and dicumyl peroxide adjacent said rubbery layer; and co-curing said uncured layers at a temperature of at least 250° F. to provide a unitary structure therefrom.

4. A process for preparing a composite pipe which comprises forming a hollow cylindrical inner layer comprising an uncured rubbery copolymer of butadiene with acrylonitrile, polyvinyl chloride, and 0.5 to 3% of dicumyl peroxide; forming a middle layer of an uncured thermosetting resinifiable polymeric mix with glass fiber therein comprising a liquid polymer of a $C_4$ to $C_6$ conjugated diolefin prepared in the presence of an alkali metal catalyst, a crosslinking agent selected from the group consisting of syrene, vinyl toluene and diallyl phthalate, and 0.5 to 6% of dicumyl perioxide on top of said inner layer; forming an outer layer comprising an uncured rubbery copolymer of butadiene with acrylonitrile, polyvinyl chloride, and 0.5 to 3% of dicumyl peroxide on top of said middle layer; and co-curing said uncured inner, middle, and outer layers at a temperature between 250° F. and 300° F. to provide a unitary structure therefrom, which is capable of transporting liquids without weeping therein.

5. The laminate according to claim 1 which is a solid rectangular sheet.

6. The process according to claim 3 in which the laminate is a solid rectangular sheet.

7. A composite pipe which comprises rubbery polymer inner and outer layers selected from the group consisting of a copolymer of butadiene with acrylonitrile, a copolymer of butadiene with styrene, natural rubber, and neoprene, a layer intermediate the inner and outer layers composed of thermosetting resin with a reinforcing element imbedded therein, and prepared from a liquid polymer of a $C_4$ to $C_6$ conjugated diolefin, all layers containing dicumyl peroxide and having been co-cured from an uncured state at a temperature of at least 250° F., to provide a unitary structure therefrom capable of transporting liquids without weeping therein.

8. A composite pipe as in claim 7 wherein the intermediate thermosetting resin layer, before co-curing, contains a crosslinking agent selected from the group consisting of styrene, vinyl toluene, and diallyl phthalate.

9. A composite pipe as in claim 7 wherein the reinforcing element is glass fiber.

10. A composite pipe as in claim 7 wherein the intermediate thermosetting resin layer, before co-curing, contains a crosslinking agent selected from the group consisting of styrene, vinyl toluene, and diallyl phthalate and wherein the reinforcing element is glass fiber.

References Cited in the file of this patent

UNITED STATES PATENTS

| | | |
|---|---|---|
| 1,763,973 | Lefebure | June 17, 1930 |
| 2,498,652 | Daly | Feb. 28, 1950 |
| 2,653,884 | Hussey et al. | Sept. 29, 1953 |
| 2,668,789 | Phreaner | Feb. 9, 1954 |
| 2,669,535 | Orr | Feb. 16, 1954 |
| 2,805,181 | Groff et al. | Sept. 3, 1957 |
| 2,826,570 | Ivett | Mar. 11, 1958 |

FOREIGN PATENTS

| | | |
|---|---|---|
| 356,818 | Great Britain | Sept. 14, 1931 |